United States Patent
Mann

(10) Patent No.: US 7,156,666 B2
(45) Date of Patent: Jan. 2, 2007

(54) CONNECTING DEVICE FOR A MULTILAYER FLAT ELEMENT EQUIPPED WITH ELECTRICAL FUNCTIONAL ELEMENTS AND FLAT ELEMENT

(75) Inventor: Detlef Mann, Gunzenhausen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/526,764

(22) PCT Filed: Sep. 5, 2003

(86) PCT No.: PCT/FR03/02651

§ 371 (c)(1),
(2), (4) Date: Aug. 23, 2005

(87) PCT Pub. No.: WO2004/025995

PCT Pub. Date: Mar. 25, 2004

(65) Prior Publication Data

US 2006/0099833 A1 May 11, 2006

(30) Foreign Application Priority Data

Sep. 10, 2002 (DE) .................. 102 41 728
May 28, 2003 (DE) .................. 203 08 376 U

(51) Int. Cl.
*H01R 12/00* (2006.01)
*H05K 1/00* (2006.01)

(52) U.S. Cl. ........................................ 439/55
(58) Field of Classification Search .......... 439/55, 439/60, 68, 71, 78, 82, 571; 361/760; 174/266

See application file for complete search history.

(56) References Cited

U.S. PATENT DOCUMENTS

| | | | |
|---|---|---|---|
| 2,982,934 A | | 5/1961 | Browne |
| 5,106,308 A | * | 4/1992 | Gollomp et al. .............. 439/67 |
| 6,188,028 B1 | * | 2/2001 | Haba et al. ................. 174/266 |
| 6,196,876 B1 | * | 3/2001 | Paagman .................... 439/607 |
| 6,511,347 B1 | * | 1/2003 | Chapman et al. ........... 439/571 |
| 2001/0017766 A1 | * | 8/2001 | Murowaki et al. .......... 361/752 |

FOREIGN PATENT DOCUMENTS

| | | |
|---|---|---|
| DE | 78 01 989 | 7/1979 |
| DE | 43 25 024 | 2/1995 |
| DE | 297 18 843 | 1/1998 |
| FR | 2 646 968 | 11/1990 |
| FR | 2 652 980 | 4/1991 |
| GB | 1 159 390 | 7/1969 |

* cited by examiner

*Primary Examiner*—Chandrika Prasad
(74) *Attorney, Agent, or Firm*—Oblon, Spivak, McClelland, Maier & Neustadt, P.C.

(57) ABSTRACT

A connector for a flat multilayer element that includes a first rigid glazing pane provided with one or more electrical functional elements and a second rigid glazing pane joined flat to that side of the first rigid glazing pane that is provided with the functional elements. The second pane has at least one cutout for making an electrical connection to the functional elements. A liner is fastened in the cutout by a projection, the edge of which lies in the plane between the two rigid panes and/or catches, via the rear, on an undercut of the cutout. The liner serves as a counterbearing surface for fastening at least one connection piece electrically connected to the functional elements.

23 Claims, 3 Drawing Sheets

CONNECTING DEVICE FOR A MULTILAYER FLAT ELEMENT EQUIPPED WITH ELECTRICAL FUNCTIONAL ELEMENTS AND FLAT ELEMENT

BACKGROUND OF THE INVENTION

1. Field of the Invention

The invention relates to a connector for a flat multilayer element that comprises a first rigid glazing pane provided with one or more electrical functional elements and a second rigid glazing pane joined flat to that side of the first rigid glazing pane that is provided with the functional elements, this second pane having at least one cutout for making an electrical connection to the functional elements.

The invention also relates to a flat element equipped with such a connector.

2. Description of Background Art

It is generally known that systems based on thin electrically conducting layers may be use as resistance heating elements by applying an electrical voltage. There are many applications of this technique both in the automobile sector and in the building sector.

In general, these multilayer systems deposited on flat substrates, for example window glazing, comprise at least one metal layer, for example made of silver, and (for transparent multilayer systems) dielectric layers on both sides of the silver layer and, optionally, also blocking layers made of various materials, and among these also covering layers for increasing the mechanical strength capability of the multilayer structure. In many cases, the infrared radiation reflection properties of multilayer systems are also used as thermal insulation.

To establish a uniform current density in these multilayer systems used as heating layers is usually a problem. It is necessary above all to prevent areas being locally overheated by high current densities, called hot spots. To achieve this, and in many applications, the heating layer is provided with plane electrodes in the form of a ribbon. They consist, for example, of thin metal ribbons deposited or attractively colored and electrically conducting, which are printed and optionally baked, and they allow the current to be introduced and removed over as wide a base as possible. However, in most cases, these connections do not meet optical/esthetic requirements and must consequently be masked. Since in many applications, for example for vehicle windows, they are mostly located along the edge of the substrate, they can be produced with little workmanship.

It is also known, in such heating layers, how to vary the flow and distribution of the current by means of fine lines that divide the heating layer into individual current paths or sections electrically connected in parallel to one another, and the ohmic resistances of which are if possible all the same.

German patent application 10208552.8 discloses a plate element provided with an electrically conductive coating ("heating layer") that is suitable for being connected directly to the voltages of the usual mains in the domestic field. It is essentially formed from a multilayer composite structure that comprises a first rigid pane, with the heating layer deposited on it and an adhesive layer, and a second rigid pane. In the electrical connection region of the heating layer, the second rigid plane is provided with a bore. In this bore, two regions of different polarity of the heating layer are located in close proximity. Provided in each of these regions is an electrode applied to the heating layer, to which electrode a current lead is joined by soft solder. The current flow between the two connection terminals belonging to the same heating layer is guided, as already mentioned, by dividing up the heating layer by means of fine lines.

DE-U1-20 107 908 discloses a connector in which a glazing unit coated so as to be electrically conducting is provided with retaining elements that are in the form of clamping fittings serving at the same time as supports for electrical contacts. Resilient tabs incorporated into the clamping fittings are applied so as to be electrically conducting on the coating of the glazing unit and pressed against the latter.

In another context, DE-A1-19 958 879 discloses an insulating glazing unit provided with a composite glass pane, the adherent layer of which includes functional elements (solar cells). These electrical connection conductors are each passed through a cutout made in one of the panes of the composite and in the opposite rigid pane of the insulating glass, that region of this penetration into the intermediate space of the insulating glass between these panes being surrounded by a spacer of annular shape. The conductors may also be passed through a hollow pin of a point support that is used for fastening the insulating glazing unit to a subjacent structure.

In the field of fittings and fastenings for composite glazing units, DE-A1-3 908 983, DE C2-4 325 024 and DE-U1-8 701 693 teach the technique consisting in providing, in the rigid pane, cutouts into which the fastening elements may be inserted and fastened. These fastening elements may have projections in the form of a radial flange which extend into the adhesive layer of the composite and which, when the assembly is completed, engage via the rear in the glazing unit. Their cutouts may optionally have an undercut. In the latter case, undercut-engaging pegs are also described for composite glass fastenings (DE-A1-3 811 249). The surface of the other side of these composite glazing units each time remains entirely intact. The last mentioned sources do not concern electrical connectors.

BRIEF SUMMARY OF THE INVENTION

The objective of the invention is to further improve a connector of the type indicated at the beginning and to create a flat element equipped therewith.

According to the invention, this objective is achieved in that a liner is fastened in the cutout of the rigid pane by a projection, the edge of which lies in the plane between the two rigid panes and/or catches, via the rear, on an undercut of the cutout, and in that the liner serves as a counterbearing surface for fastening at least one connection piece electrically connected to the functional elements. Moreover, a flat element is equipped with electrical functional elements incorporated between two rigid plates and at least one connector according to the invention. The features of the independent claims and of the dependent claims that are associated with the connector and with the flat element give advantageous developments of these subject matters.

According to the invention, a liner is placed in the cutout of one of the rigid panes and serves as a counterbearing surface for fastening at least one connection element electrically connected to the functional element. This liner possesses or forms a "radial" projection which by geometrical complementarity is anchored into the cutout.

As electrical functional elements, heating elements are especially envisioned, particularly heating layers, but also sensors and solar elements, which each time are incorporated into a multilayer structure and have to be brought into electrical contact with the outside. As regards the structure described here of the connector or of the liner, the function of the elements that must finally be connected is of secondary importance.

The functional elements may in this case be placed either on that rigid pane with the cutout or on the rigid pane facing the latter. It is also possible to envision constructions in which both panes are provided with electrical functional elements, for example electrodes for electroluminescent lighting elements or solar cells, and are equipped with one or more connectors according to the invention.

The edge of the cutout can catch, via the rear, on said projection of the liner in the plane lying between the two rigid panes (the plane of the adhesive layer). This liner will then be fastened in the cutout before the glazing assembly is manufactured in such a way that the projection can be incorporated into the adhesive layer. The thickness of the projection will therefore be less than the thickness of the adhesive layer.

The projection may also engage behind a rear layer or bevel of the cutout, located inside the composite. This may be produced in a manner known per se by a liner made of several parts, the individual parts of which are placed together in the actual cutout. However, it is also possible to use, as liner, an appropriate undercut-engaging peg that forms said projection only when it has been passed into the cutout and clamped therein. The two variants may be installed advantageously after the manufacture of the glazing assembly.

Particularly preferably, the liner may be used as base for a point of collection of all the electrical interface functions of the flat element.

It then forms the base of the actual electrical connection contacts which are preferably configured as spring contacts. For applications principally intended in a flat heating element, the working voltages of which are relatively high, only a low (AC) current has to be transferred; likewise, the heating elements used in buildings are as a general rule not exposed to any vibration. Thus, no corrosion problems should be expected which, in other fields of use (construction of vehicles) may have the effect of degrading the contact by high transfer resistances. In addition, should it be necessary, the contact region may be hermetically sealed in such a way that moisture and dirt cannot penetrate.

Should it be necessary, the electrical contacts with the functional elements or their electrodes may, however, also be produced by soft soldering or protected only as a supplement. Soft soldering techniques are known that allow these soldering locations to be reliably melted without direct contact with the heat source (induction soldering or laser soldering) and can be used even through the coated pane without destroying the coating.

The liner may serve as base for a connector plug by means of which a connecting conductor of the functional elements may be electrically connected. However, it is obvious that a fixed connecting conductor may also be provided, said conductor emerging from a connector casing that is fastened to the liner and optionally has a plug on the end of it.

In another preferred variant, at least one switching member, for turning the functional elements on and off, is provided in the region of the liner. In the use as "flat heating element", this switching member may, in another advantageous variant, be controlled by at least one temperature probe that detects the actual temperature of the heating layer in the connection region. Since the highest current densities could occur in this region of the local electrical power supply, at least one temperature probe will be placed therein.

These temperature probes may even be also produced as current limiters (for example cold conductors whose ohmic/electrical resistance increases when the temperature increases), thereby making it possible to dispense with said switching member if an appropriate characteristic line is provided. Optionally, it is also possible to provide an electrical protection device that electrically protects the functional element in question.

In yet another advantageous embodiment, the liner may also form the base of a device for evaluating or receiving the control signals by means of which a surface heating element/functional element may be individually addressed by a remote control and be connected and disconnected. In the case of a heater, these control signals are created, for example, by means of room thermostats and temperature probes. They may be transmitted by special conductors or by the supply conductors already provided as bus conductors. In the latter case, coded control pulses are superimposed on the supply voltage or the mains voltage, and may be electronically filtered in the connector of the surface heating element in question. However, the control signals are preferably transmitted by radio, infrared, etc. and, in the region of the connector, an appropriate receiver and decoder, in addition to the switching or control members connected downstream, will be provided.

Complementarily, the liner may be used as base for a manually adjustable temperature limit which makes it possible, with priority over the internal temperature probe optionally provided, to define a maximum electrical power consumed and therefore the maximum effective temperature of the flat heating element, below the absolute maximum temperature preset in the factory of the flat heating element in question.

In one particularly preferred embodiment, as many as possible of all the necessary components will be miniaturized (for example in the form of a microchip or a microprocessor) and brought together in a connection box or case that may be fastened with little workmanship required onto said liner. Screws may be provided for the connection. However, it would also be possible to provide a snap-fit (releasable) connection if the necessary sealing of the contact region can thus be obtained. Optionally, an adhesively bonded connection between the liner and the connection box could also be envisioned.

At the same time as fastening said connection box, it is also possible to connect the electrical (spring) contacts to the functional elements. This has the advantage, on the one hand, of not exceeding a predefined proof pressure on the contacts and, on the other hand, when optionally releasing and removing the connection box subsequently, for the purpose of maintenance or repair, of also deactivating the functional elements, by disconnecting them from the current or electrically.

All of the active elements of the connector may, optionally after appropriately adapting the voltage level, be electrically supplied with an operating voltage optionally applied as such to the functional elements. However, it would also be possible to supply them autonomously using batteries that will be placed in the connection box.

It is also possible to provide in the connection region, with little workmanship required, operational indicators for checking whether the functional elements are connected, activated or ready to operate (on standby). When the flat element is transparent, these displays may be light signals, the light from which passes through the flat element. It is therefore obvious that they shall not be covered by opaque masks or the like, or that appropriate observation windows shall be provided in such a mask.

In all the differences between the connector described here and the point fastening elements normally used for plates (of glass), it is possible to imagine using a connection point that has the features described here also as fastening points for the flat element when the fastening element can be adapted to the imposed conditions as regards electrical standpoint and when it can be mounted on a subjacent structure. The latter may, for example, have devices for suspending the flat element or elements, which devices correspond to appropriate counter-supports provided on the connection box that will be configured so as to have the appropriate stability. Otherwise, the flat element will be fastened in its mounting position by other suitable means that engage for example its edge (for example, frames, retention clips), or will also be incorporated edgewise into a wall or window facade.

The connector according to the invention may be advantageously installed practically anywhere on the surface of the flat element, whether near its edge or in the central region. It is obvious that, should it be necessary, several of these connectors may be provided on the same flat element, for example if several heating fields or solar cell modules capable of operating independently have to be connected.

When positioning the connector for a flat heating element, the requirement to have as uniform as possible a current density in the heating layer to be supplied remains an essential parameter, and this may entail certain restrictions on the choice of location of the connector.

Further details and advantages of the subject of the invention will become apparent from the drawing of examples of embodiments of a connector for a flat heating element and from the following detailed description of them.

BRIEF DESCRIPTIONS OF THE DRAWINGS

In the simplified representations, not drawn to scale:

DESCRIPTION OF THE EMBODIMENTS

Figure 1:
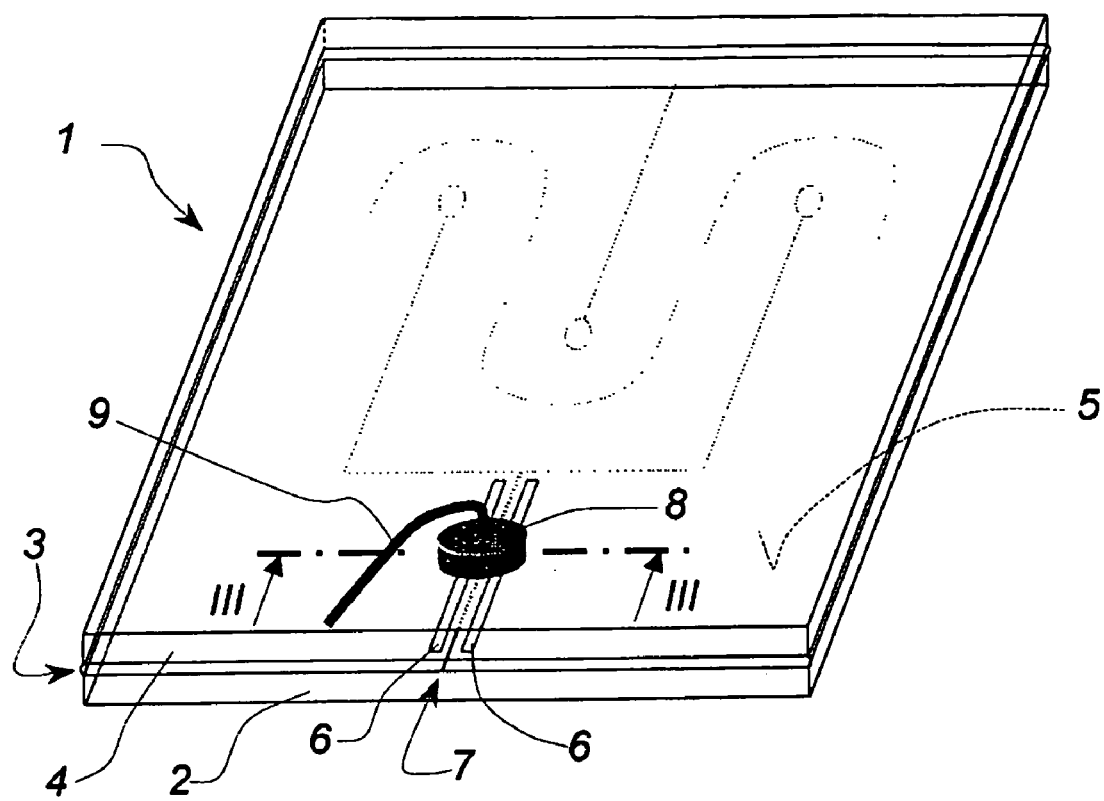
FIG. 1 shows an overall perspective view of a flat heating element with a connector according to the invention.

In FIG. 1, a flat heating element 1 is produced in the form of a glazing assembly provided with a first rigid pane 2, with an interlayer 3 and with a second rigid pane 4. The first rigid pane 2 is preferably a thermally prestressed glass provided on its surface facing the interlayer 3 with a heating layer 5 configured as an electrically conductive coating. The heating layer 5 is formed from a composition and/or from a succession of layers suitable for operation as a flat heating layer and which can be thermally stressed sufficiently for prestressing the pane. Suitable multilayer systems have been described many times in the prior art so it is unnecessary to go into further details about them. They may be manufactured with a high transmission for visible light and therefore with the aim of being transparent.

Suitable arrangements ensure that said coating 5 is passivated at the periphery, along the edge of the flat heating element 1, that is to say there is neither an electrically conducting contact near its external or front surface nor any risk of the multilayer material being corroded by this external environment. For example, it is possible to provide in the coating 5, a short distance from the outer edge of the flat heating element 1, a continuous peripheral separating line that fulfills these two functions. As a variant, it is also possible, in a known manner, to free completely from the multilayer material, or to remove subsequently, a narrow peripheral strip along the edge of the flat heating element 1. In all cases, a hermetic seal is formed at the border interstice using the synthetic thermoplastic adhesive material that forms the interlayer 3 (for example polyvinyl butyral (PVB) or ethylene/vinyl acetate (EVA)). It will be understood that the material of the interlayer must be selected so as to be properly compatible with the material of the coating 5.

FIG. 1 shows the essential components of the electrical power supply for the heating layer 5, namely firstly two plane electrodes 6 in the form of a ribbon, which are placed on both sides of a line of separation 7 that isolates the two poles of the heating layer 5 from each other. The current flows between the two electrodes in a manner predetermined by the structural lines made in the heating layer and as is clearly apparent from the drawing. A connection box 8 provided with a connecting cable 9 (shown only in part) is fastened at the point of electrical contact between the heating layer 5 and the pair of electrodes 6 to the second rigid pane. Particularly advantageously, all the electrical interfaces and devices are brought together locally at one point on the flat heating element 1.

As a departure from the representation shown in FIG. 1, the electrodes may of course have shapes other than that of a ribbon (for example a semicircle). Furthermore, it is possible for the structural lines to start in the region of the heating layer that is covered by the electrodes, in such a way that the electrode is brought into electrical contact with several current paths electrically connected in parallel. Such a configuration or structuring of the heating layer alongside its connection region may above all be necessary when it would be impossible for the current supply to be near the edge, unlike what is shown.

Figure 2:
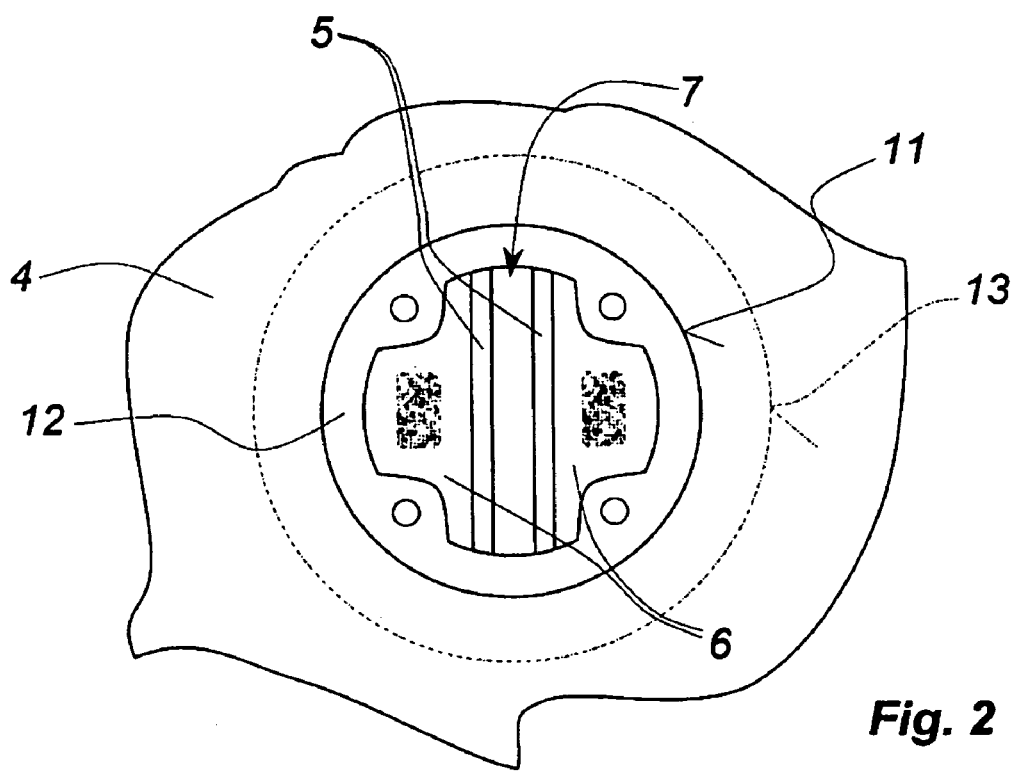
FIG. 2 shows a view of the connection region with a liner inserted for fastening the connector.

FIG. 2 shows the electrical-connection region of the flat heating element in a plan view in which the connection box has been omitted. The pane 4, which may again be made of glass (optionally prestressed) or of synthetic material, has a bore 11 into which a liner 12 in the form of a bush is securely inserted. Its outer perimeter is matched as precisely as possible to the diameter or perimeter of the bore 11. This liner 12 catches behind the edge of the bore 11, in the plane of the interlayer 3, by means of a flange projection 13, configured here as an annular shoulder. The open internal space of the liner 12 reveals the heating layer 5, the two electrodes 6 and the line of separation 7. The surfaces are shown by gray rectangular fields on which the electrical-connection contacts may be placed.

The liner 12 may include shaped elements that are used for fastening a connector and for preventing it from rotating. In this embodiment example, these are catches formed in the wall of its bore and are provided with bores into which screws may be screwed. As a departure from the representation, these shaped elements may be placed unsymmetrically in order to allow the insertion of other components in the correct position.

Figure 3:
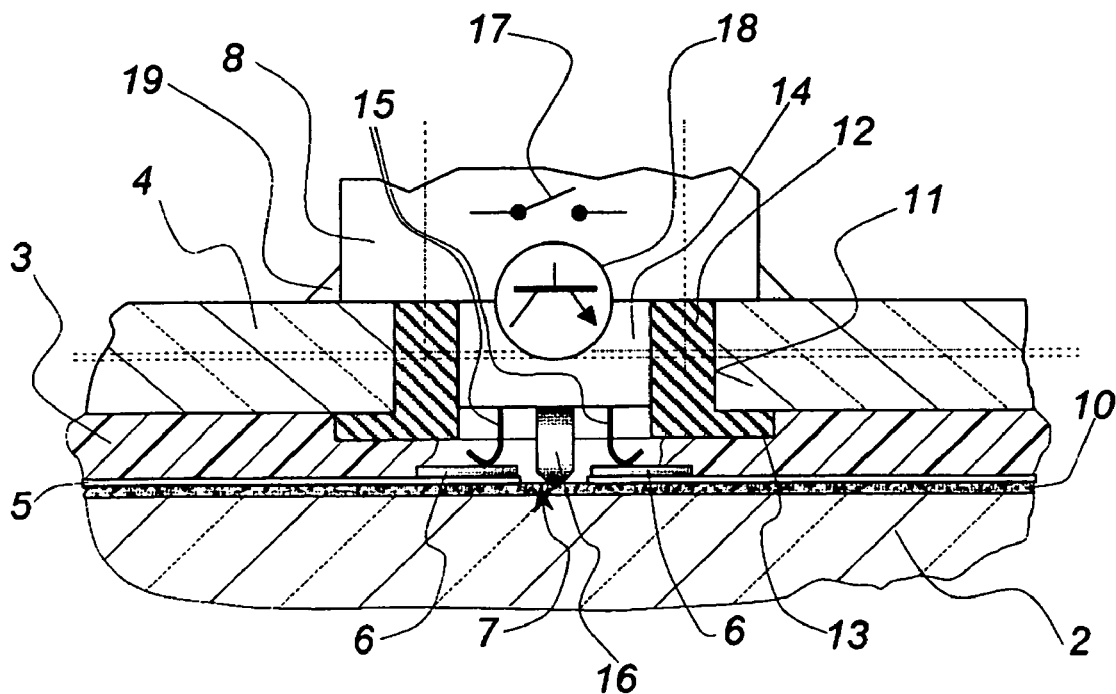
FIG. 3 shows a sectional view on the line III—III of FIG. 1 of a first embodiment of the connector.

FIG. 3 shows a greater detail example of the structure of the electrical connection device according to the invention, in cross section, identical parts being indicated by a different reference number than in FIGS. 1 and 2. The multilayer structure of the flat heating element may be seen. The figure shows a portion of the thickness of the rigid pane 2, and a double chain-link line passing through the rigid pane 4 also indicates that its thickness has been reduced as shown. It is obvious that these two rigid panes may be much thicker than the interlayer 3. In the region of the electrodes 6 and of the connection box 8 (which is shown here only partly), their material has been removed in order to allow obstacle-free access to the electrodes 6. A defined amount of material has to be removed before the two rigid panes are joined together by melting the interlayer 3, in such a way that the adhesive material cannot advance as far as the electrodes.

In the present representation, the diameter of the bore 11 has been shown smaller than the thickness of the pane 4; it will be understood that the bore is dimensioned with a width sufficient for the type of connector provided each time.

Optical masking of the connection region is not necessary for its operation—it merely fulfills an esthetic function. In the mounted state, the pane 2, and therefore that side of the flat heating element not facing a connector, will form its visible side. It is only by way of example that, in the connection region of the electrode 6, an opaque layer 10 has been provided between the heating layer 5 and the glass surface in order to mask this region from the outside. If necessary, it is also possible, of course, to obtain the same effect with other means, for example by bulk-tinting the rigid pane 2, by applying a decoration to its outer surface and/or by designing the heating layer itself as a mirror, for example by omitting an non-reflecting layer on its side close to the surface.

Moreover, the actual electrodes may also be used as decorative elements by being given a visually attractive appearance. It will then be possible to dispense with the opaque layer 10.

As could already seen in FIG. 2, the bush-shaped liner 12 is fastened in the bore 11 of the second rigid pane 4. It axial length corresponds substantially to the thickness of the rigid pane 4 (a few millimeters) and it penetrates further into the plane of the interlayer 3. Its projection 13, extending as a radial flange toward the outside, engages behind the edge of the bore 11 in such a way that the liner 12 is held therein by shape complementarity and cannot be extracted therefrom.

As was pointed out above, this liner must be inserted into the bore 11 before the two rigid panes 2 and 4 are joined together. It is only after the thermoplastic interlayer 3 has melted that the liner is fixed definitively. It may be seen in the drawing that the projection 13 is still on top of the material of the interlayer.

The liner 12 forms the base of the connection box 8. Two vertical chain-linked lines denote a screwed connection between the two portions. Fastened in the bore of the liner 12 by the connection box 8 is a support block 14 from which emerge two spring contacts 15 that extend as far as the electrodes 6 and rest in an electrically conducting manner on them. A temperature probe 16, indicated symbolically, is also held in place by means of the contact block 14 and the liner 12 in contact with the coated surface of the rigid pane 2. Said probe serves to detect the actual temperature in the contact region of the electrodes 6. The support block 14 is inserted into the correct position, optionally force-fitted by suitable shaped elements, in the liner 12 in such a way that the spring contacts 15 come into contact with the electrode provided each time, and is then immobilized. The support block may form with the connection box 8 a fixed first unit and this may be fitted into the liner 12 at the same time as said connection box.

Although in the intended use on a flat heating element 1 the spring contacts 15 meet the requirements for a reliable and durable electrical connection, should it be necessary they could be soldered, in particular by suitably pretinning them, it being possible for the necessary heat to be provided without any contact, for example through the coated pane 2.

The switching symbols of a switch 17 and a transistor 18 represent the electrical or electronic equipment of the support block 14 or of the connection box 8 and may each time represent a number of corresponding elements. Other control and switching functions are also assigned to this region of the connector in addition to supplying the electrical voltage of the power supply to the electrode 6 via the connection cables 9.

A switching element has to assess the measurements by the temperature probe 16 and possibly disconnect, at least temporarily, the current supply to the heating layer should the actual temperature exceed a permissible threshold. However, it is also possible to provide a switching element that protects against temperature overruns and, in a manner known per se, limits the consumed electrical power to acceptable values.

At least one switch, which may have an electronic or electromechanical configuration, manages the supply of current to the heating layer. This switch may be basically connected manually and locally, and be controlled by sensors, for example the temperature probe 16, or by a remote control device. As already indicated, the latter may form part of an automatic system for regulating the temperature of a room (air-conditioning plant, etc.), but may also, optionally and fundamentally, be manually controlled.

If the control signals are transmitted by radio, an appropriate receiver and a decoder and other switching means (for example amplifiers) will have to be provided in the connection box 8 or in the support block 14. If the control signals are transmitted via conductors, it will be necessary to provide suitable evaluation members for this purpose, in particular if control signals are transmitted via the conductors, which are present in any case (cable 9), for connection to the mains and must be filtered in situ.

Not shown here are elements for displaying the operational status of the flat heating element 1. In a preferred variant, these display elements may be configured in the form of light signals (light-emitting diodes) and, for example, may be placed near the line of separation 7 between the spring contacts 15 and beside the temperature probe 16 so that they can be seen from outside of the rigid pane 2. They are also supplied electrically via the support block 14 and controlled by said switching elements 17, 18.

After the connector has been manufactured and its operation checked, it is also possible, if necessary, to form a seal between the surface of the pane and the connection box 8 with a seal 19. As a departure from what is shown, it is also possible, of course, to place this seal directly between the underside of the connection box 8 and the surface of the pane.

Figure 4:
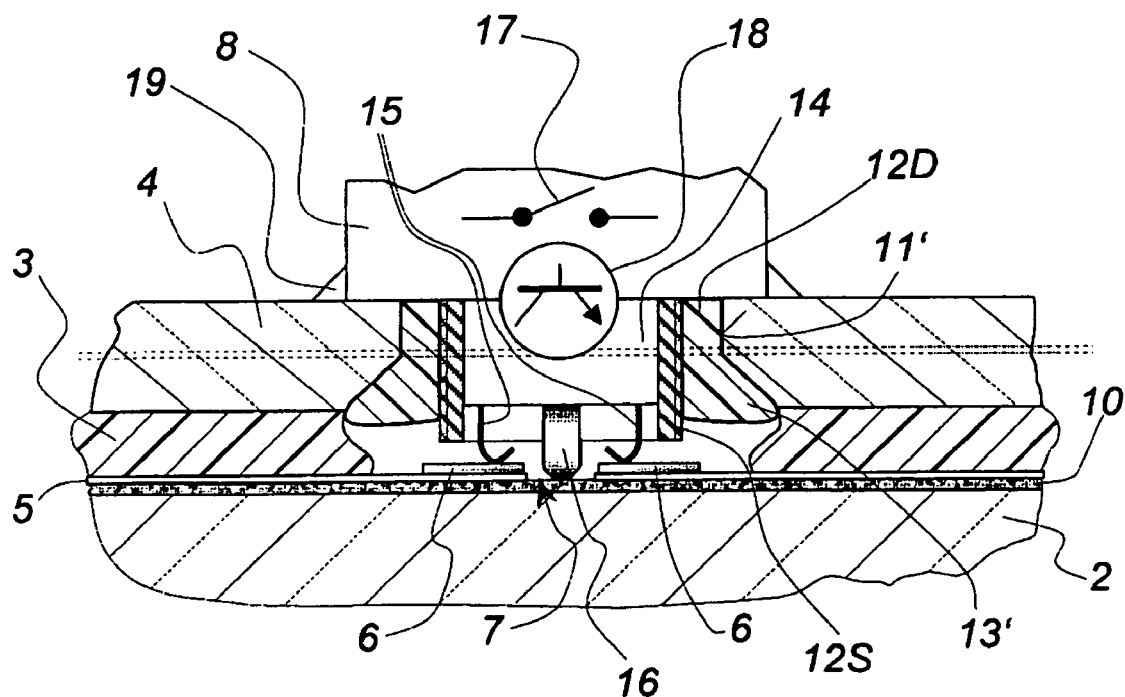
FIG. 4 shows a sectional view, corresponding to that of FIG. 3, of a second embodiment of the connector according to the invention.

FIG. 4 shows, in a sectional view that corresponds to that of FIG. 3, a variant of a liner which in this case is used in an undercut bore 11' in the second rigid pane 4. Where this figure shows the same components as in FIG. 2, these bear the same reference numbers and will not be explained further. The liner is made as two parts, namely with an undercut-engaging peg 12D and a bush screw 12S. Such undercut-engaging bushes are already known in many glass applications. The technique of producing undercut or recessed bores 11' in glass panes is also a mature one.

The undercut-engaging peg 12D may be inserted from the outside into the bore 11' after the assembly has been produced. The bush screw 12S, which may be made of metal or of a high-strength synthetic material, is then screwed in. Vertical lines along its outer edge indicate its self-tapping external thread. As the screwing proceeds, the undercut-engaging peg 12D deforms as indicated into a projection 13' that extends radially as a flange. It may be seen that this projection fills the undercut bevel of the bore 11' with geometrical complementarity until it becomes impossible for it to be extracted axially. Likewise, the bush screw 12S is immobilized radially and axially in the bore by its external thread engaging in the peg.

The optional penetration of the undercut-engaging peg 12D into the plane of the interlayer does not result in excessive local stresses that could have the effect of locally delaminating or even breaking a pane. In case of doubt, the material of the interlayer will be removed if it is not deformable enough in the region of the bore 11' over the distance indicated, and hence up to approximately its edge, in such a way that the peg can expand freely in the plane of the interlayer.

The actual bush screw can also be screwed only as far as a predetermined depth in order not to come into contact with the electrodes in the bottom of the bore 11' or to damage the latter or the heating layer 5. It must also not touch the contact springs 15.

Unlike when fastening a load-bearing glass, in the present application one need not expect high forces to be acting, so the clamping force of the peg does not need to be particularly high. However, it may be necessary for the pane 4 to be also made of prestressed glass, and in that case the bore 11' will have to be made before the prestressing operation.

In one particularly advantageous variant, the connection box 8 and the bush screw 12S may be combined into a fixed entity. The casing of the connection box could then be used as a lever for screwing the bush screw in by hand, the underside of the connection box that has just been placed on the top side of the pane 4 at the edge of the bore 11' then forming a depth stop. In this unit, the support block may be fastened in the correct position with the contact springs and optionally the temperature probe.

Although, in both FIG. 3 and FIG. 4, the liner is practically flush with the main surface of the rigid pane 4, the connection box projects slightly above this surface. As this side of the flat heating element 1 is not for the most part turned toward the observer/user in the mounted state, but is possibly located so as to face a wall or is integrated into the latter, the visibility of the connector on the mask (or optionally on the opaque electrodes configured as decorative elements) remains on the one hand limited, and on the other hand there is in practice no risk generated by unauthorized or inadvertent manipulation of the connector. If a handle is provided for actuating a control member of the connector, this will, of course, preferably be placed at the most accessible points, for example near the edge of the flat heating element.

Although with regard to FIG. 4 reference was made only to an undercut-engaging peg for the "undercut bore" application in the second rigid pane 4, should it be necessary, in particular if the thickness of the pane 4 is rather small, for example less than 5 mm, it would be possible for this purpose to use, as liner, other suitable components of the type already indicated and similar to that of the liner 12 of FIG. 2.

Figure 5:
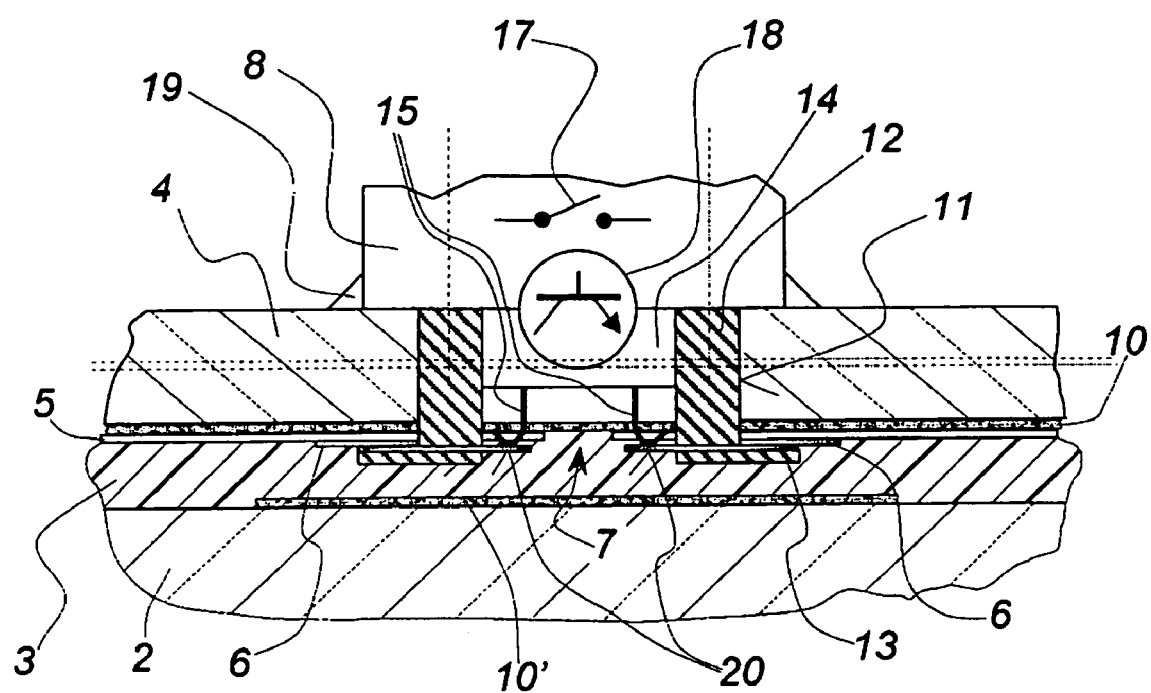
FIG. 5 shows another sectional view corresponding to FIG. 3 of a third embodiment of the connection according to the invention.

The embodiment shown in FIG. 5 combines a connector according to the invention with a plate element, in which the electrical functional elements to be connected are on the second rigid pane 4 provided with the bore 11. Unlike the embodiments described above, in this case no direct contact is provided between the spring contacts 15 and the plane electrodes 6 of the heating layer 5. The projection 13 of the liner 12 serves instead to keep the connection bridges 20 in contact with the plane electrodes 6 after the liner 12 has been inserted into the bore 11 of the rigid pane 4 and fastened therein. Since the liner may be clamped with the connection box 8 and therefore the projection 13 is pulled with a prestress against the plane electrodes 6, this contact point is not particularly critical. The surfaces of the connection bridges coming into contact with the plane electrodes may be roughened or provided with spikes so as to allow slight penetration of the connection bridges into the plane electrodes. However, in this case it is also possible, as already mentioned above, to carry out a soldering operation by supplying heat, after the connection bridges and/or the plane electrodes have been pretinned.

The ends of the connection bridges 20 on the opposite side from the plane electrodes 6 penetrate the internal space of the liner 12. At this point they form, in a manner equivalent to the plane electrodes of the previous applications, bearing faces for the spring contacts 15 in such a way that, after mounting, they are electrically connected in a reliable manner by means of a respective connection bridge 20 to the respective actual plane electrodes 6.

The connection bridges 20 are preferably securely incorporated into the liner 12, so as to configure as simply as possible the mounting of the connector. This may, for example, be obtained by overmolding the connection bridges 20 (thin strips of sheet) with the plastic of the liner 12 as it is being formed.

FIG. 5 again shows the line of separation 7 between the two poles of the heating layer 5 and the opaque layer 10, on which the heating layer is deposited in each case in the contact region. As a complement, another opaque layer 10' is in this case also provided on the flat side of the rigid pane 2 lying inside the composite, which optically covers the contact region and may be furthermore produced in the form of a decorative element. It is possible, depending on the requirements, to choose also to omit one or both opaque layers, as these are not important for the operation of the connector or of the plate element.

Whereas the adhesive interlayer 3 is continuous in the contact region in this illustration, it may, again also if required, be provided in this variant with a cutout in a manner similar to FIGS. 3 and 4.

In FIG. 5, no temperature probe has, admittedly, been illustrated, but it will be understood that a suitable detection element for detecting the actual temperature in the connection region may also be provided in this embodiment variant. It will be conceivable, for example, to produce an additional thermal probe in a manner similar to the connection bridges 20 illustrated here and to bring it into contact with the heating layer or a plane electrode.

When this connector is used for electrical functional elements of other types, for example for thin-film solar cells or for impact or precipitation probes, as indicated at the beginning, its basic structure is not modified from that of the embodiment examples shown here. By departing from the drawings, it is possible to provide only a single contact or a plurality of contacts in each cutout.

The invention claimed is:

1. A connector for a flat multilayer element comprising:
a first rigid glazing pane provided with one or more electrical functional elements;
a second rigid glazing pane joined flat to that side of the first rigid glazing pane that is provided with the one or more functional elements, the second rigid pane having at least one cutout for making an electrical connection to the one or more functional elements; and
a liner fastened in the cutout by a projection, an edge of the projection lying in a plane between the first and second rigid panes and/or catches, via a rear, on an undercut of the cutout, and
wherein the liner serves as a counterbearing surface for fastening at least one connection piece electrically connected to the one or more functional elements.

2. The connector as claimed in claim 1, wherein the cutout is provided in the first rigid pane having the one or more functional elements or in the second rigid pane.

3. The connector as claimed in claim 1, wherein at least two regions of the one or more functional elements are of different polarity and are brought into a region of the cutout, and wherein each of the at least two regions is brought into electrical contact with a connection piece fastened to the liner.

4. The connector as claimed in claim 3, wherein each connection piece comprises at least one spring contact brought into electrical contact with a respective of the one or more functional elements.

5. The connector as claimed in claim 3, wherein a flat electrode of the one or more functional elements, electrically connected to each connection piece, is provided in a region of each connection piece.

6. The connector as claimed in claim 1, wherein the liner is configured in a form of a bush and is inserted into the cutout, its projection catching, via the rear, on the edge of the cutout in a plane of an interlayer.

7. The connector as claimed in claim 1, wherein the projection of the liner is provided with at least one contact configured to make an electrical connection between at least one connection piece and at least one of the one or more functional elements, this at least one functional element being associated with the second rigid pane in the cutout of which the liner is placed.

8. The connector as claimed in claim 7, wherein the at least one contact is produced as a connection bridge that has, in an internal space of the liner in a form of a bush, a contact surface for a connection piece and, on one face of the projection, a contact surface for connection to a respective of the one or more functional elements.

9. The connector as claimed in claim 1, wherein the liner comprises a peg or an undercut-engaging peg that is fastened in the cutout by a screw.

10. The connector as claimed in claim 9, wherein the screw is configured as a bush screw with an external thread, its internal space forming a housing for other components of the connector.

11. The connector as claimed in claim 1, further comprising means for fastening or suspending a flat of the one or more functional elements in a subjacent structure or a wall of a building.

12. The connector as claimed in claim 1, wherein a flat element is provided as the one or more functional elements with an electrically conductive coating of a heating layer.

13. The connector as claimed in claim 12, further comprising a temperature probe for detecting an actual temperature of the heating layer.

14. The connector as claimed in claim 13, further comprising a switching element configured to be controlled by the temperature probe, to interrupt or reduce heating current should a predetermined temperature threshold be exceeded.

15. The connector as claimed in claim 12, further comprising a manually actuated adjustment device for introducing a temperature threshold for the heating layer.

16. The connector as claimed in claim 12, as a receiver configured to receive control signals transmitted without any contact and as a switching device configured to be controlled by the receiver, for remotely connecting and disconnecting the heating layer.

17. The connector as claimed in claim 1, further comprising at least one display element or a light signal displaying a state of operation of the one or more functional elements.

18. The connector as claimed in claim 1, further comprising a connection box in a form of a casing acting as a cover with respect to external environment.

19. A flat element with electrical functional elements incorporated between said first and second rigid panes of said connector as claimed in claim 1, wherein the flat element is electrically connected to said connector.

20. The flat element as claimed in claim 19, wherein the first rigid pane is a pane coated with an electrically conductive coating.

21. The flat element as claimed in claim 19, wherein an optical mask is provided at least in a region of the cutout or of the connector on that side not facing the cutout.

22. The flat element as claimed in claim 19, wherein at least one electrode configured to make electrical contact between the electrical functional element and the connector is placed on one of the two rigid panes in a region of the connector.

23. The flat element as claimed in claim 19, including at least one display element configured to display an operating state of the one or more functional elements.

* * * * *